US011893167B2

(12) United States Patent
Okano

(10) Patent No.: US 11,893,167 B2
(45) Date of Patent: Feb. 6, 2024

(54) INFORMATION PROCESSING DEVICE, INFORMATION PROCESSING METHOD, NON-TRANSITORY COMPUTER READABLE MEDIUM

(71) Applicant: CANON KABUSHIKI KAISHA, Tokyo (JP)

(72) Inventor: Yu Okano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/317,202

(22) Filed: May 15, 2023

(65) Prior Publication Data

US 2023/0409126 A1 Dec. 21, 2023

(30) Foreign Application Priority Data

May 20, 2022 (JP) .................................. 2022-082996

(51) Int. Cl.
*G06F 3/0346* (2013.01)
*G06F 3/01* (2006.01)
*G06F 9/451* (2018.01)

(52) U.S. Cl.
CPC ............ *G06F 3/0346* (2013.01); *G06F 3/014* (2013.01); *G06F 9/453* (2018.02)

(58) Field of Classification Search
CPC ......... G06F 3/0346; G06F 3/014; G06F 9/453
See application file for complete search history.

(56) References Cited

U.S. PATENT DOCUMENTS

| 2015/0286279 A1* | 10/2015 | Lim ..................... G06F 3/04815 715/863 |
| 2019/0265781 A1* | 8/2019 | Kehoe ................... G06F 3/0304 |
| 2022/0206587 A1* | 6/2022 | Da-Yuan ................. G06F 3/014 |

FOREIGN PATENT DOCUMENTS

WO 2014/058565 A1 4/2014

OTHER PUBLICATIONS

Pretto, A. et al., "Calibration and performance evaluation of low-cost IMUs" 20th IMEKO TC4 International Symposium and 18th International Workshop on ADC Modelling and Testing Research on Electric and Electronic Measurement for the Economic Upturn (Sep. 2014) pp. 429-434.

* cited by examiner

*Primary Examiner* — Amit Chatly
(74) *Attorney, Agent, or Firm* — Carter, DeLuca & Farrell LLP

(57) ABSTRACT

An information processing device controls a display for displaying a guide that instructs a user to perform each of a plurality of patterns of motions including translational motions or rotational motions of an inertial sensor that correspond to a first axis and a second axis, which are perpendicular to each other. Based on inertial information and position and orientation information acquired by causing the inertial sensor to perform the plurality of patterns of motions, the information processing device acquires parameters including a degree of correlation between actual inertial values of the inertial sensor corresponding to the first axis and the inertial information corresponding to the second axis.

10 Claims, 11 Drawing Sheets

FIG. 5A

| TIME 141 | ACCELERATION 142 | ANGULAR VELOCITY 143 |
|---|---|---|
| 0.000 | {0.5,0,1} | {0,0,0} |
| 0.005 | {1,0,1} | {0,0,0} |
| 0.010 | {0.8,0,1} | {0,0,0} |
| ... | ... | ... |

FIG. 5B

| TIME 144 | POSITION AND ORIENTATION 145 |
|---|---|
| 0.000 | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |
| 0.017 | $\begin{bmatrix} 1 & 0 & 0 & 1 \\ 0 & 1 & 0 & 0 \\ 0 & 0 & 1 & 0 \\ 0 & 0 & 0 & 1 \end{bmatrix}$ |
| 0.033 | $\begin{bmatrix} 1 & 0 & 0 & 2 \\ 0 & 1 & 0 & 0 \\ 0 & 0 & 1 & 0 \\ 0 & 0 & 0 & 1 \end{bmatrix}$ |
| ... | ... |

FIG. 10

| GUIDE | INERTIAL INFORMATION | TRAJECTORY OF POSITION AND ORIENTATION |
|---|---|---|
| TRACE UPWARD | ACCELERATION $a_z$ | TRAJECTORY 1 OF POSITION AND ORIENTATION |
| WAG FINGER IN ROLL DIRECTION | ANGULAR VELOCITY $\omega_x$ (ROLL) | TRAJECTORY 2 OF POSITION AND ORIENTATION |
| MOVE TO RIGHT | ANGULAR VELOCITY $\omega_z$ (YAW) | TRAJECTORY 3 OF POSITION AND ORIENTATION |
| WAG FINGER IN ROLL DIRECTION | ANGULAR VELOCITY $\omega_x$ (ROLL) | TRAJECTORY 4 OF POSITION AND ORIENTATION |
| TRACE DOWNWARD | ACCELERATION $a_z$ | TRAJECTORY 5 OF POSITION AND ORIENTATION |
| LOOK DOWN AT TOP | ANGULAR VELOCITY $\omega_y$ (PITCH) | TRAJECTORY 6 OF POSITION AND ORIENTATION |
| TRACE FOUR POINTS | ACCELERATION $a_x, a_y$ | TRAJECTORY 7 OF POSITION AND ORIENTATION |

INFORMATION PROCESSING DEVICE, INFORMATION PROCESSING METHOD, NON-TRANSITORY COMPUTER READABLE MEDIUM

BACKGROUND OF THE INVENTION

Field of the Invention

The present invention relates to an information processing device, an information processing method, and a non-transitory computer readable medium.

Description of the Related Art

As a technique for calculating calibration parameters (gains, biases, or the like) for calibrating measured values (inertial information) of an inertial sensor, there is a technique described in WO 2014/058565 and "Calibration and performance evaluation of low-cost IMUs".

WO 2014/058565 describes a technique for calculating calibration parameters for angular velocity by using a camera and an angular velocity sensor. "Calibration and performance evaluation of low-cost IMUs" discloses a technique for calculating calibration parameters by moving an inertial sensor (an acceleration sensor or an angular velocity sensor) without using a camera.

However, in the techniques according to WO 2014/058565 and "Calibration and performance evaluation of low-cost IMUs", when calibration parameters are calculated in a user environment, a user needs to appropriately move the inertial sensor (the acceleration sensor or the angular velocity sensor). However, a typical user has no knowledge about how to appropriately move the inertial sensor.

U.S. Patent Application Publication No. 2015/0286279 (Specification) describes an example in which a user moves the orientation of an inertial sensor with reference to a display on a screen so as to estimate gains and biases.

However, the technique according to U.S. Patent Application Publication No. 2015/0286279 (Specification) cannot estimate cross-axis sensitivity that represents a correlation between a value (actual value) that is to be output for a certain axis and a measured value for another axis. In order to estimate a position or an orientation more accurately by using the inertial sensor, calibration parameters including the cross-axis sensitivity need to be calculated.

SUMMARY OF THE INVENTION

An object of the present invention is to provide a technique capable of calculating calibration parameters, which include cross-axis sensitivity, for an inertial sensor in a user environment.

An aspect of the present invention is an information processing device comprising at least one memory and at least one processor which function as: a first acquisition unit configured to acquire inertial information indicating inertial values, which are accelerations or angular velocities of an inertial sensor, from the inertial sensor; a second acquisition unit configured to acquire position and orientation information indicating at least one of a position and an orientation of the inertial sensor; a control unit for configured to control a display for displaying a guide that instructs a user to perform each of a plurality of patterns of motions including two translational motions or two rotational motions, the two translational motions including a translational motion of the inertial sensor corresponding to a first axis and a translational motion of the inertial sensor corresponding to a second axis perpendicular to the first axis, and the two rotational motions including a rotational motion of the inertial sensor corresponding to the first axis and a rotational motion of the inertial sensor corresponding to the second axis; and a parameter acquisition unit configured to acquire parameters including a degree of correlation between actual inertial values of the inertial sensor corresponding to the first axis and the inertial information corresponding to the second axis, based on the inertial information and the position and orientation information acquired when the plurality of patterns of motions of the inertial sensor are performed.

An aspect of the present invention is an information processing method, including: a first acquiring step of acquiring inertial information indicating inertial values, which are accelerations or angular velocities of an inertial sensor, from the inertial sensor; a second acquiring step of acquiring position and orientation information indicating at least one of a position and an orientation of the inertial sensor; a controlling step of controlling a display for displaying a guide that instructs a user to perform each of a plurality of patterns of motions including two translational motions or two rotational motions, the two translational motions including a translational motion of the inertial sensor corresponding to a first axis and a translational motion of the inertial sensor corresponding to a second axis perpendicular to the first axis, and the two rotational motions including a rotational motion of the inertial sensor corresponding to the first axis and a rotational motion of the inertial sensor corresponding to the second axis; and a parameter acquiring step of acquiring parameters including a degree of correlation between actual inertial values of the inertial sensor corresponding to the first axis and the inertial information corresponding to the second axis, based on the inertial information and the position and orientation information acquired when the plurality of patterns of motions of the inertial sensor are performed.

Further features of the present invention will become apparent from the following description of exemplary embodiments with reference to the attached drawings.

BRIEF DESCRIPTION OF THE DRAWINGS

FIGS. 5A and 5B are diagrams for describing information stored in a storage device according to Embodiment 1;

FIG. 10 is a diagram for describing acquired information according to Embodiment 1.

DESCRIPTION OF THE EMBODIMENTS

Figure 1:
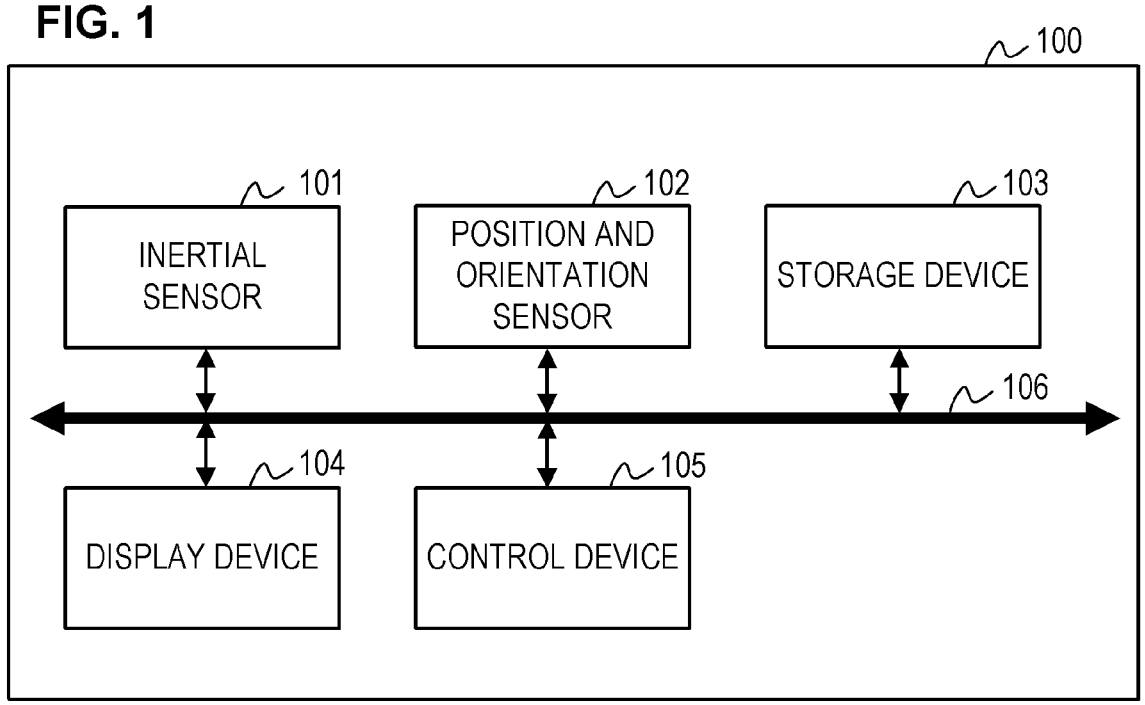
FIG. 1 is a diagram illustrating a hardware configuration of an information processing system according to Embodiment 1.

Hereinafter, a preferred embodiment of the present invention will be described in detail with reference to the accompanying drawings.

Regarding Parameters for Calibration

First, parameters (calibration parameters) for calibration of an inertial sensor will be described.

An inertial sensor (inertial measurement unit (IMU)) is a sensor adopted in a wide range of electronic devices that realize virtual reality (VR) and mixed reality (MR).

Examples of the electronic devices include a camera, a game machine, a drone, a vehicle, and a smartphone. The inertial sensor typically includes an acceleration sensor and an angular velocity sensor (gyroscope). By using the inertial sensor, the orientation of the inertial sensor (electronic device including the inertial sensor) can be calculated, and the position of the inertial sensor in the space can also be estimated.

In principle, the acceleration sensor measures an acceleration [m/s$^2$], and by integrating the acceleration twice by time an amount of change [m] in position can be calculated. The angular velocity sensor measures an angular velocity [deg/s], and by integrating the angular velocity by time, an amount of change [deg] in angle (orientation) can be calculated.

However, it is known that there is an error between a measured value of a consumer inertial sensor and an actual value. Thus, to perform the measurement by the inertial sensor as accurately as possible, it is desirable that a measured value be used after the measured value (error) is calibrated.

Calibration parameters (gains, biases, and cross-axis sensitivities) for calibrating measured values (measurement errors) of accelerations of the inertial sensor will be described by using Expression 1.

$$\begin{bmatrix} a'_x \\ a'_y \\ a'_z \end{bmatrix} = \begin{bmatrix} g_{axx} & g_{axy} & g_{axz} \\ g_{ayx} & g_{ayy} & g_{ayz} \\ g_{azx} & q_{azy} & g_{azz} \end{bmatrix} \begin{bmatrix} a_x \\ a_y \\ a_z \end{bmatrix} + \begin{bmatrix} b_{ax} \\ b_{ay} \\ b_{az} \end{bmatrix} \quad \text{Expression 1}$$

In Expression 1, ax, ay, and $a_z$ represent measured values of accelerations of the acceleration sensor in three-axis directions (X-axis, Y-axis, and Z-axis directions) perpendicular to each other, whereas $a'_x$, $a'_y$, and $a'_z$ represent accelerations (actual accelerations) obtained by calibrating (correcting) the measured values in accordance with Expression 1. Gains (scale-factors) of the X-axis, Y-axis, and Z-axis are represented by $g_{axx}$, $g_{ayy}$, and $g_{azz}$, respectively. The individual gain is a degree of correlation between a value (actual value) of an acceleration in a certain axis direction, the value being expected to be output, and a measured value of the acceleration in the certain axis direction. Biases are represented by $b_{ax}$, $b_{ay}$, and $b_{az}$. The individual bias is a fixed value included in a value (actual value) of an acceleration in a certain axis direction, the value being expected to be output. The fixed value is not dependent on a measured value of the acceleration.

In addition, cross-axis sensitivities (misalignment-factors) are represented by $g_{axy}$, $g_{axz}$, $g_{ayx}$, $g_{ayz}$, $g_{azx}$, and $g_{azy}$. The individual cross-axis sensitivity is a degree of correlation between an actual value of an acceleration in a certain axis direction and a measured value of an acceleration in another axis direction. For example, the cross-axis sensitivity $g_{axy}$ indicates a correlation between a value (actual value) of an acceleration in the X-axis direction, the value being expected to be output, and a measured value of an acceleration in the Y-axis direction. It is desirable that the cross-axis sensitivity be ideally 0. However, it is rare for a consumer acceleration sensor that the three axes are completely orthogonal to each other, that is, there is a slight inclination. Therefore, the cross-axis sensitivity is not 0.

According to Expression 1, actual accelerations in the three-axis directions can be calculated by using the measured values of accelerations in the three-axis directions and the calibration parameters (the gains, the biases, and the cross-axis sensitivities) (that is, the measured values can be accurately calibrated).

Calibration parameters (gains, biases, and cross-axis sensitivities) for calibrating measured values (measurement errors) of angular velocities of the inertial sensor will be described by using Expression 2.

$$\begin{bmatrix} \omega'_x \\ \omega'_y \\ \omega'_z \end{bmatrix} = \begin{bmatrix} g_{\omega xx} & g_{\omega xy} & g_{\omega xz} \\ g_{\omega yx} & g_{\omega yy} & g_{\omega yz} \\ g_{\omega zx} & g_{\omega zy} & g_{\omega zz} \end{bmatrix} \begin{bmatrix} \omega_x \\ \omega_y \\ \omega_z \end{bmatrix} + \begin{bmatrix} b_{\omega x} \\ b_{\omega y} \\ b_{\omega z} \end{bmatrix} \quad \text{Expression 2}$$

In Expression 2, $\omega_x$, $\omega_y$, and $\omega_z$ represent measured values of angular velocities of the angular velocity sensor around three axes (X-axis, Y-axis, and Z-axis) perpendicular to each other, whereas $\omega'_x$, $\omega'_y$, and $\theta'_z$ represent angular velocities (actual angular velocities) obtained by calibrating (correcting) the measured values in accordance with Expression 2. Gains of the X-axis, Y-axis, and Z-axis are represented by $g_{\omega xx}$, $g_{\omega yy}$, and $g_{\omega zz}$, respectively. The individual gain is a degree of correlation between a value (actual value) of an angular velocity in a rotation direction around a certain axis, the value being expected to be output, and a measured value of the angular velocity in the rotation direction around the certain axis. Biases are represented by $b_{\omega x}$, $b_{\omega y}$, and $b_{\omega z}$. The individual bias is a fixed value included in a value (actual value) of an angular velocity in a rotation direction around a certain axis, the value being expected to be output. The fixed value is not dependent on a measured value of the angular velocity.

In addition, cross-axis sensitivities (misalignment-factors) are represented by $g_{\omega xy}$, $g_{\omega xz}$, $g_{\omega yx}$, $g_{\omega yz}$, $g_{\omega zx}$, and $g_{\omega zy}$. The individual cross-axis sensitivity is a degree of correlation between a value (actual value) of an angular velocity in a rotation direction around a certain axis, the value being expected to be output, and a measured value of an angular velocity in a rotation direction around another axis. It is rare for a consumer angular velocity sensor that the three axes are completely orthogonal to each other, that is, there is a slight inclination. Therefore, the cross-axis sensitivity is not 0.

According to Expression 2, actual angular velocities around the three axes can be calculated by using the measured values of angular velocities around the three axes and the calibration parameters (the gains, the biases, and the cross-axis sensitivities) (that is, the measured values can be accurately calibrated).

The gain of an acceleration is generally calculated based on the standard gravitational acceleration (gravitational acceleration at north latitude/south latitude 45 [deg]: 9.80665 [m/s$^2$]) as a reference. For this reason, after the calibration has been performed in the factory, if the user uses the inertial sensor at a place where the latitude is greatly different, the value of the gain of the acceleration cannot be properly obtained. Therefore, it is desirable to be able to calibrate the measured values in the user environment as well.

Embodiment 1

FIG. 1 is a diagram illustrating an example of a hardware configuration of an information processing system 100 (calibration apparatus) according to Embodiment 1. The information processing system 100 includes an inertial sensor 101, a position and orientation sensor 102, a storage device 103, a display device 104, a control device 105, and a transmission path 106.

The inertial sensor 101 is an inertial measurement unit (IMU) including an acceleration sensor and an angular velocity sensor. The inertial sensor 101 is, for example, held by a hand of a user (worn by a user on a finger of his or her hand). The inertial sensor 101 measures respective accelerations in three-axis directions orthogonal to each other and respective angular velocities around three axes. The inertial sensor 101 continuously measures the accelerations and the angular velocities (inertial information) during operation. The inertial sensor 101 can convert the measured accelerations and angular velocities (inertial information) into digitized numerical data and output the digitized numerical data.

The position and orientation sensor 102 calculates its own position and orientation (the position and the orientation of the position and orientation sensor 102 itself).

The position and orientation sensor 102 includes, for example, an imaging device. The position and orientation sensor 102 recognizes a characteristic pattern (such as a black and white marker) provided at a specific position in a range of an imaging target by using the imaging device. The position and orientation sensor 102 calculates a relative position and orientation of the imaging device (position and orientation sensor 102) with respect to the marker based on the position and orientation (the position and the orientation) of the marker in a captured image. Next, the position and orientation sensor 102 calculates an absolute position and orientation of the position and orientation sensor 102 based on the calculated relative position and orientation and a predetermined absolute position of the marker. Alternatively, the position and orientation sensor 102 may use an intersection point of a plurality of lines or the like as a feature point instead of the marker and obtain a relative position and orientation of the imaging device (position and orientation sensor 102) with respect to the feature point, based on the feature point in a captured image. That is, the position and orientation sensor 102 may use a so-called simultaneous localization and mapping (SLAM) technique.

The position and orientation sensor 102 may calculate its own position and orientation by using, for example, an optical sensor (an optical sensor that measures the position of an optical marker) installed in the corner of a room. The position and orientation sensor 102 may calculate its own position and orientation by using other mechanical methods. The position and orientation sensor 102 may be any device as long the device is capable of calculating its own position and orientation, such as a device using a mechanical method for reading a value of an encoder or the like.

The position and orientation sensor 102 does not need to be included in the information processing system 100 and may be included in another apparatus physically separated from the information processing system 100.

The storage device 103 is a storage medium (such as a semiconductor memory, a hard disk, or a solid-state drive). The storage device 103 stores (holds) information (programs and data) for the information processing system 100 to perform processing. The information stored in the storage device 103 includes, for example, inertial information (information about accelerations and angular velocities measured by inertial sensor 101) and information about position and orientation (information acquired by the position and orientation sensor 102). In the following description, some of the programs and data may be stored in an external storage medium (for example, a data server, a network storage, an external memory, or the like) instead of the storage device 103.

The display device 104 is a display that displays an image. The display device 104 displays a composite image obtained by combining a virtual object (CG) with a captured image obtained by capturing a real space by a camera.

The control device 105 includes a processor. Specifically, the control device 105 includes a central processing unit (CPU), a digital signal processor (DSP), or the like. The control device 105 performs various processing of the information processing system 100 by executing the program stored in the storage device 103 or another storage medium. The control device 105 generates a composite image by combining a virtual object (CG) with a captured image obtained by capturing a real space (space in front of the user) by the camera.

The transmission path 106 connects the inertial sensor 101, the position and orientation sensor 102, the storage device 103, the display device 104, and the control device 105 to each other. The transmission path 106 does not necessarily connect the components physically to each other. The transmission path 106 may be a transmission path using a LAN, a WAN, the Internet, or the like other than wiring (bus) inside a specific device. Information output from each component may be transferred to another component via the transmission path 106 without delay or may be transferred to another component at a desired timing after the control device 105 buffers (temporarily stores) the information in a file or a memory.

Internal Configuration of Control Device

Figure 2:
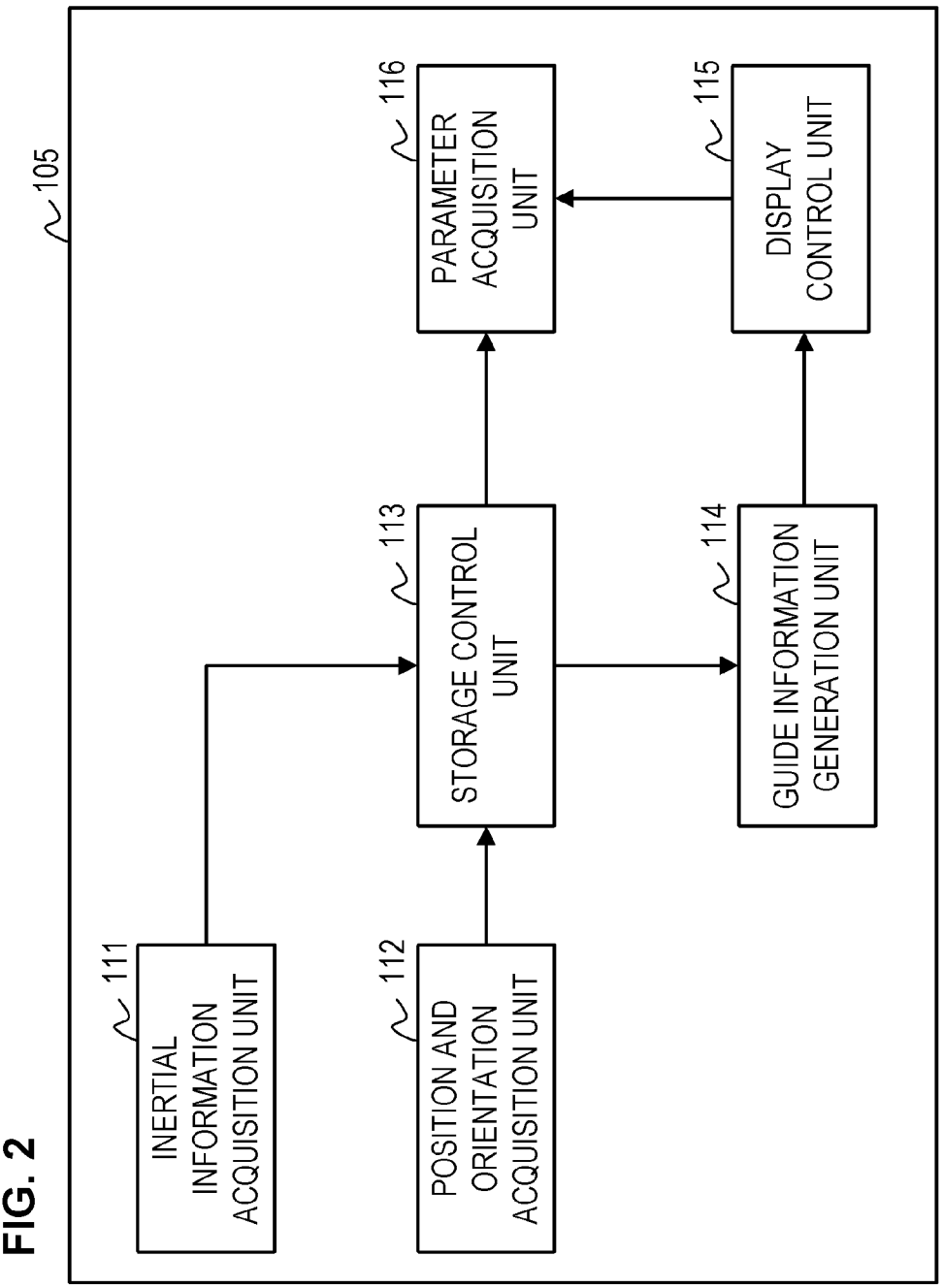
FIG. 2 is a diagram illustrating a software configuration of a control device according to Embodiment 1.

FIG. 2 is a diagram illustrating an example of logical configuration (software configuration) of the control device 105. The control device 105 includes an inertial information acquisition unit 111, a position and orientation acquisition unit 112, a storage control unit 113, a guide information generation unit 114, a display control unit 115, and a parameter acquisition unit 116. At least a part of the logical configuration of the control device 105 may be included in any one of the inertial sensor 101, the position and orientation sensor 102, the storage device 103, and the display device 104.

The inertial information acquisition unit 111 acquires measured values of inertial values (accelerations and angular velocities) from the inertial sensor 101 as inertial information. Since the inertial sensor 101 measures an acceleration and an angular velocity corresponding to each of the three axes, the inertial information includes information about the respective accelerations and the respective angular velocities (information about the inertial values) corresponding to the three axes.

The position and orientation acquisition unit 112 calculates (acquires) the position and orientation of the inertial sensor 101 based on an image (captured image) obtained by capturing the inertial sensor 101 by a camera (imaging device) of the position and orientation sensor 102 and the position and orientation of the position and orientation sensor 102 calculated by the position and orientation sensor 102.

The storage control unit 113 stores information including the inertial information acquired by the inertial information acquisition unit 111 and information about the measurement time (time stamp) of the inertial information in the storage device 103. The storage control unit 113 stores information including the information about the position and orientation of the inertial sensor 101 acquired by the position and orientation acquisition unit 112 and information about acquisition time (time stamp) of information about the position and orientation in the storage device 103. The storage control unit 113 may store the acquired information in the storage device 103 every time each component of the control device 105 acquires (generates) information. Alternatively, the storage control unit 113 may store the information in the storage device 103 at predetermined intervals or may store the information in the storage device 103 per predetermined data amount. Together with the above information, the storage control unit 113 may store, in the storage device 103, information about the temperature of the inertial sensor 101 at the time at which the inertial sensor 101 has measured the inertial information.

The guide information generation unit 114 generates guide information for causing the user to perform a plurality of patterns of motions of the inertial sensor 101. The plurality of patterns of motions includes translational motions of the inertial sensor 101 in a plurality of axis directions and rotational motions of the inertial sensor 101 around the plurality of axes. The guide information includes a plurality of guides for causing the user (experiencing person) to perform the plurality of patterns of motions. Each guide instructs the user to move the inertial sensor 101 (the hand on which the inertial sensor 101 is mounted) to a certain position or to change the orientation of the inertial sensor 101 to a certain orientation.

The display control unit 115 sequentially displays the plurality of guides included in the guide information generated by the guide information generation unit 114 on the display device 104. The user performs the translational motions and the rotational motions of the inertial sensor 101 in accordance with the guides displayed on the display device 104.

The parameter acquisition unit 116 calculates calibration parameters for the inertial sensor 101 based on the inertial information acquired by the inertial information acquisition unit 111 and the position and orientation of the inertial sensor 101 acquired by the position and orientation acquisition unit 112. The calibration parameters include cross-axis sensitivities (misalignment-factors) in the acceleration and the angular velocity. The calibration parameters are stored in the storage device 103. The calibration parameters are used when the parameter acquisition unit 116 calibrates the inertial information (for example, when the inertial information is calibrated based on Expression 1 and Expression 2).

Figure 3A:
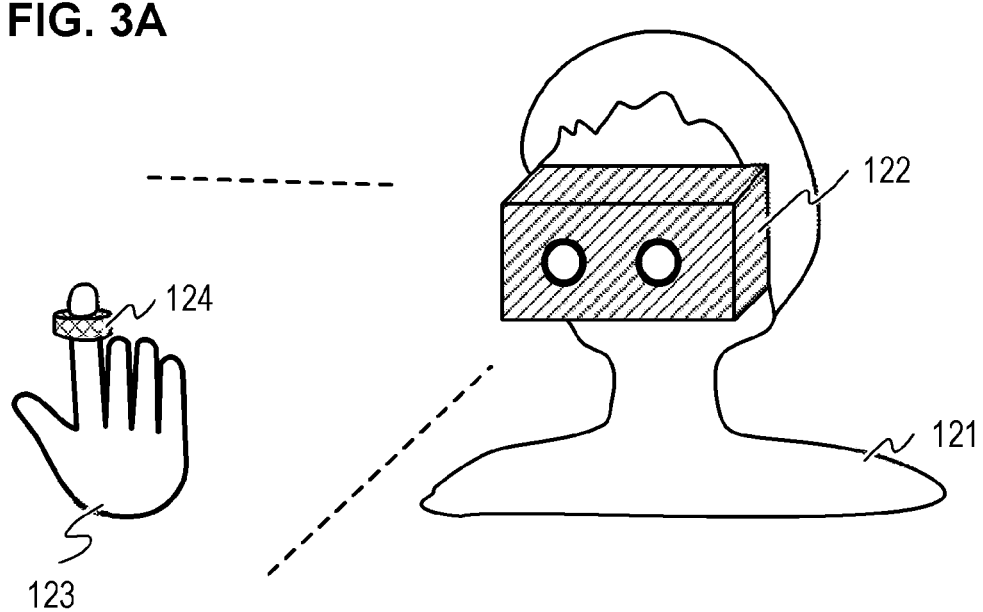
FIGS. 3A and 3B are diagrams for describing the information processing system according to Embodiment 1.

FIG. 3A is a conceptual diagram illustrating the information processing system 100. The information processing system 100 includes an HMD 122 and a controller 124. The HMD 122 is a head-mounted display. The HMD 122 includes, for example, the position and orientation sensor 102, the storage device 103, the display device 104, and the control device 105. Therefore, it can be said that the HMD 122 serves as a display device and as an information processing device. At least one of the position and orientation sensor 102, the storage device 103, the display device 104, and the control device 105 may be included in a processing device (information processing device) capable of communicating with the HMD 122.

The controller 124 is a device mountable on a finger of the user. For example, the controller 124 has a shape of a ring (a ring-like shape) so that the user can wear the controller 124 on his or her finger. The controller 124 includes an inertial sensor 101.

In FIG. 3A, a user 121 is wearing the HMD 122. The HMD 122 includes at least one camera and captures an image of a range in front of the user 121 (a range corresponding to an actual field of view) by the camera. The controller 124 is mounted on a hand 123 of the user 121. Thus, when the hand 123 moves, the controller 124 moves, and the inertial sensor 101 of the controller 124 acquires inertial information corresponding to the movement of the hand 123.

Parameter Calculation Processing

Figure 4:
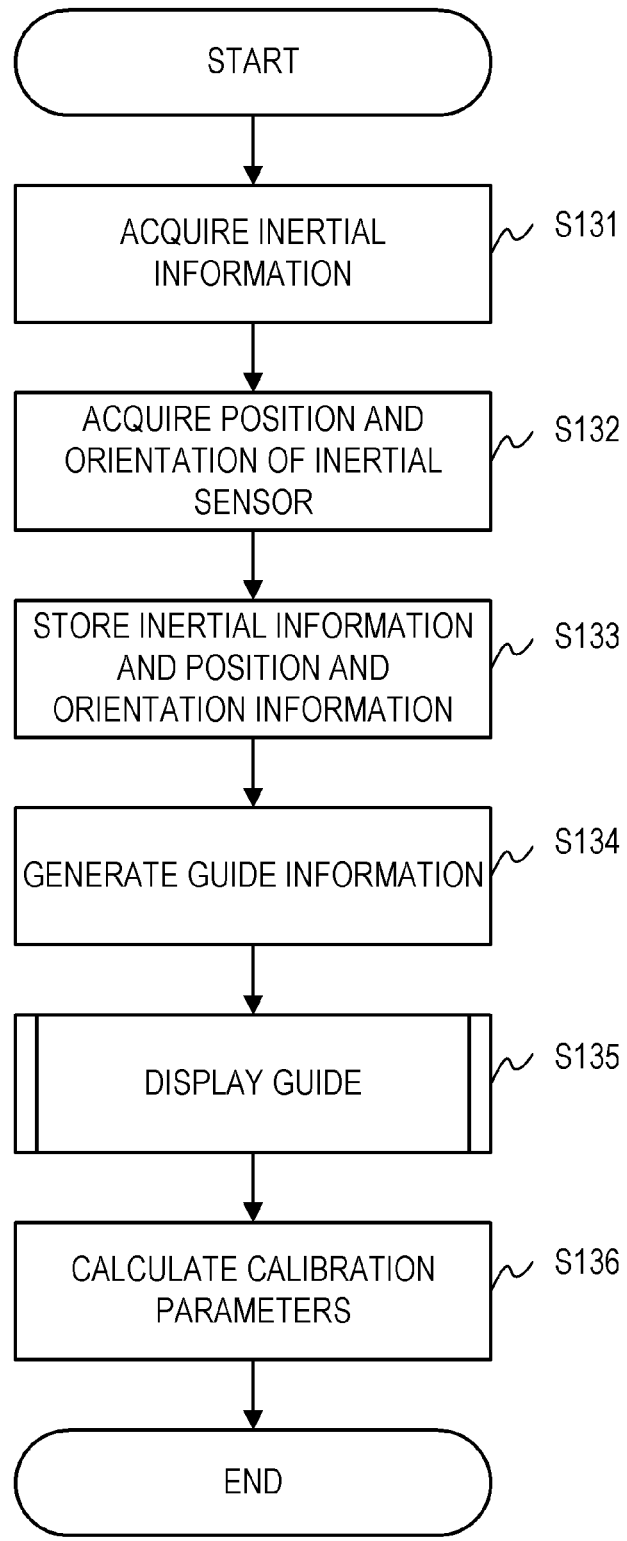
FIG. 4 is a flowchart of parameter calculation processing according to Embodiment 1.

Processing (parameter calculation processing) for calculating calibration parameters for the inertial sensor 101 will be described with reference to a flowchart illustrated in FIG. 4. The parameter calculation processing is performed when the user uses (activates) the inertial sensor 101 (controller 124) for the first time in an environment of the user.

Figure 3B:
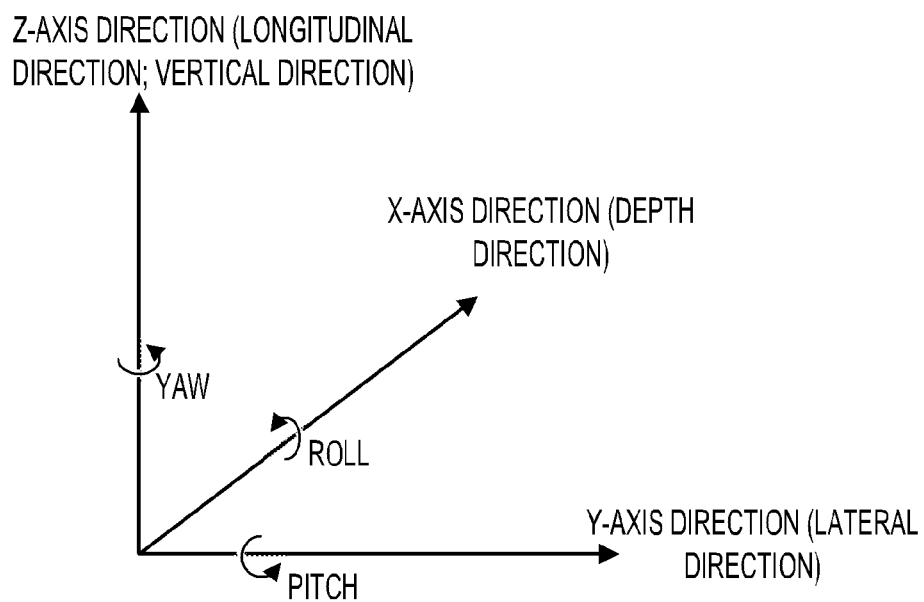

In step S131, the inertial information acquisition unit 111 acquires inertial information (measured values) measured by the inertial sensor 101. The inertial information includes respective accelerations in three-axis directions (X-axis, Y-axis, and Z-axis directions) orthogonal to each other and respective angular velocities around three axes as illustrated in FIG. 3B. The inertial information acquisition unit 111 periodically acquires inertial information, for example, every $\frac{1}{200}$ second (at 200 Hz).

In step S132, the position and orientation acquisition unit 112 calculates (acquires) position and orientation of the inertial sensor 101. For example, the position and orientation acquisition unit 112 calculates position and orientation of the inertial sensor 101 by analyzing an image (captured image) obtained by capturing the inertial sensor 101 by the camera mounted on the HMD 122 (position and orientation sensor 102).

The position and orientation acquisition unit 112 can acquire the position and orientation of the HMD 122 (own position and orientation) from the position and orientation sensor 102. In addition, for example, if a specific marker is installed in the inertial sensor 101 in advance, the position and orientation acquisition unit 112 can calculate a relative position and orientation of the HMD 122 (the position and orientation sensor 102) with respect to the specific marker based on an image obtained by capturing the specific marker. Therefore, the position and orientation acquisition unit 112 can calculate position and orientation of the inertial sensor 101 based on the position and orientation of the HMD 122, the relative position and orientation of the HMD 122 with respect to the specific marker, and the known relative position and orientation of the inertial sensor 101 with respect to the specific marker. In this way, the position and orientation acquisition unit 112 calculates the position and orientation of the inertial sensor 101 by extracting (tracking) the marker in the captured image. The position and orientation acquisition unit 112 calculates the position and orientation of the inertial sensor 101, for example, every $\frac{1}{60}$ second (at 60 Hz). Alternatively, the relative position and orientation of the HMD 122 with respect to the specific marker may be calculated based on matching between a pre-stored model representing the appearance of the position and orientation sensor 102 and the position and orientation sensor 102 in the captured image. Further, the relative position and orientation of the HMD 122 (the position and orientation sensor 102) with respect to the specific marker may be calculated based on determination (hand tracking) of the size and shape of the hand in the captured image.

In step S133, the storage control unit 113 stores a combination of the inertial information measured by the inertial sensor 101 and information about the measurement time (time stamp) of the inertial information in the storage device 103. In addition, the storage control unit 113 stores a combination of the information about the position and orientation of the inertial sensor 101 acquired by the position and orientation acquisition unit 112 and information about the measurement time of the position and orientation (the time at which the captured image has been captured; time stamp) in the storage device 103. In Embodiment 1, as illustrated in FIGS. 5A and 5B, the storage control unit 113 stores the information about the accelerations and the angular velocities corresponding to the three axes and the information about the position and orientation of the inertial sensor 101.

The information stored in the storage device 103 will be described in detail with reference to FIGS. 5A and 5B. As illustrated in FIG. 5A, inertial information (information about a triaxial acceleration sensor value 142 and a triaxial angular velocity value 143) and time stamp 141 for the inertial information are stored in the storage device 103 every time the inertial information is acquired (for example, at a frequency of 200 times per second). In addition, as illustrated in FIG. 5B, position and orientation 145 of the inertial sensor 101 and a time stamp 144 corresponding to the time at which the camera has captured an image to calculate the position and orientation are stored in the storage device 103, for example, every time the position and orientation is calculated (for example, at a frequency of 60 times per second).

The position and orientation 145 is represented by a 4×4 matrix. Specifically, the position and orientation 145 includes a 3×3 matrix 146, which is a three-dimensional rotation matrix (which indicates an orientation), and a 3×1 matrix 147, which indicates respective positions in the three-axis directions (a movement amount from a reference position). Note that not all of the information illustrated in FIGS. 5A and 5B needs to be stored in the storage device 103 semi-permanently. The storage control unit 113 may sequentially delete the information no longer needed in the storage device 103, arrange the information by a method such as compression, or move the information to another storage unit by communication.

The processing of steps S131 to S133 is repeatedly executed even while the processing of step S134 and subsequent steps is being performed.

In step S134, the guide information generation unit 114 generates information about a plurality of patterns of motions (hereinafter, referred to as a "motion set") including respective translational motions in the three-axis directions (X-axis, Y-axis, and Z-axis directions corresponding to the triaxial acceleration sensor) and respective rotational motions around the three axes. In the state illustrated in FIG. 3A, for example, as illustrated in FIG. 3B, the X-axis direction is the depth direction (front-back direction) when viewed from the user, and the Y-axis direction is the lateral direction. The Z-axis direction is the longitudinal direction (vertical direction; gravity direction). In Embodiment 1, the motion set includes translational motions in the X-axis, Y-axis, and Z-axis directions corresponding to the triaxial acceleration sensors and rotational motions in the yaw direction (around the Z-axis), the pitch direction (around the Y-axis), and the roll direction (around the X-axis). Next, the guide information generation unit 114 generates guide information including a plurality of guides that instruct the user to perform each of the motions in the motion set. Alternatively, the guide information may be generated in advance before the processing in the present flowchart is started and stored in the storage device 103.

Figure 8A:
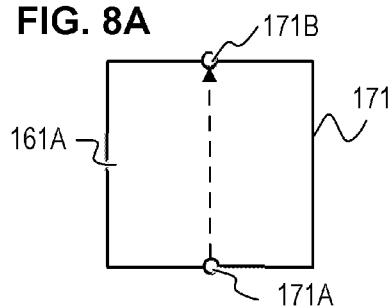
FIGS. 8A to 8H are diagrams illustrating guides according to Embodiment 1.
Figure 8B:
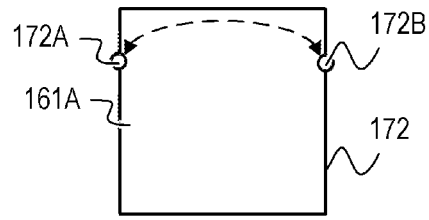
Figure 8C:
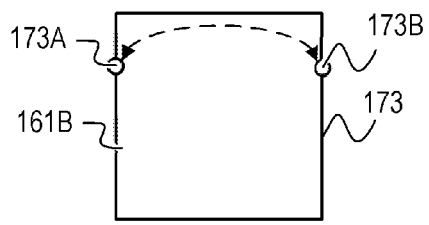
Figure 8D:
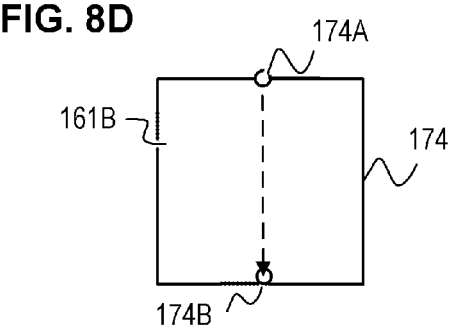
Figure 8E:
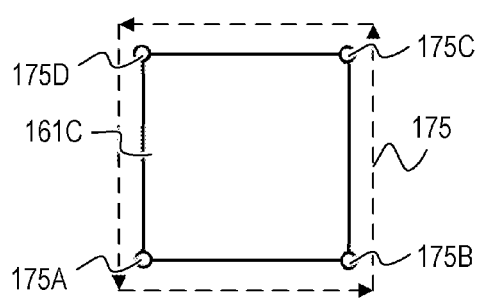
Figure 8F:
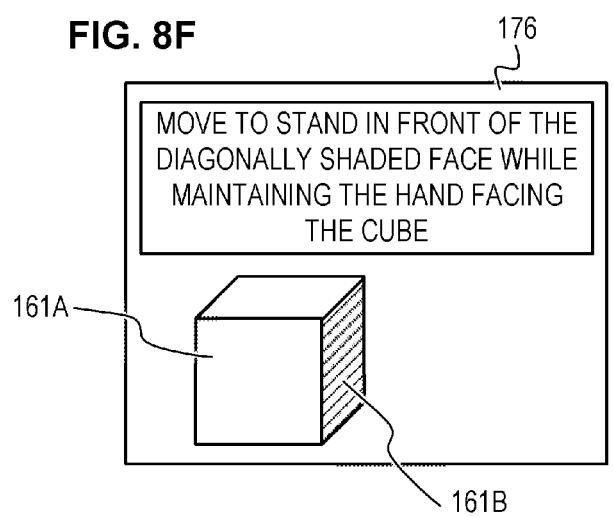
Figure 8G:
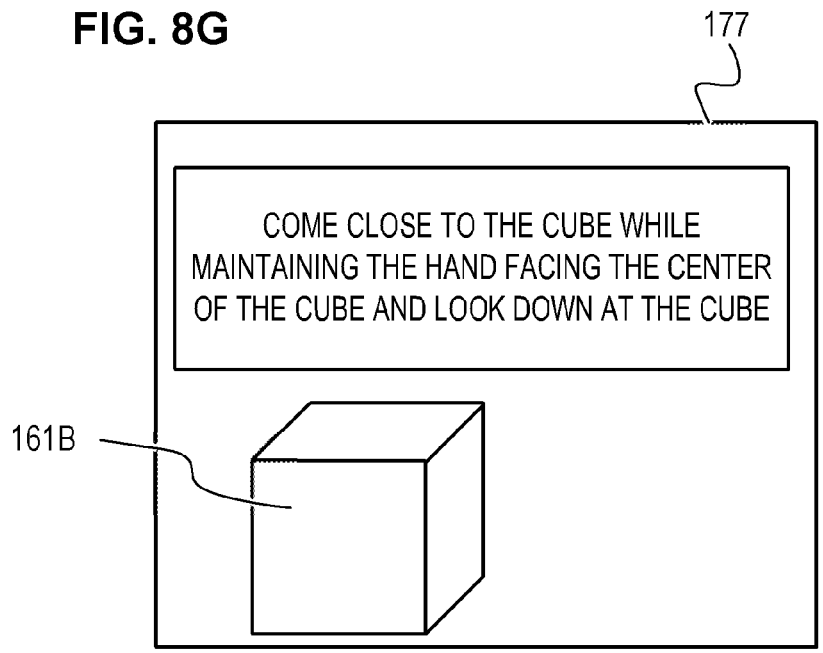
Figure 8H:
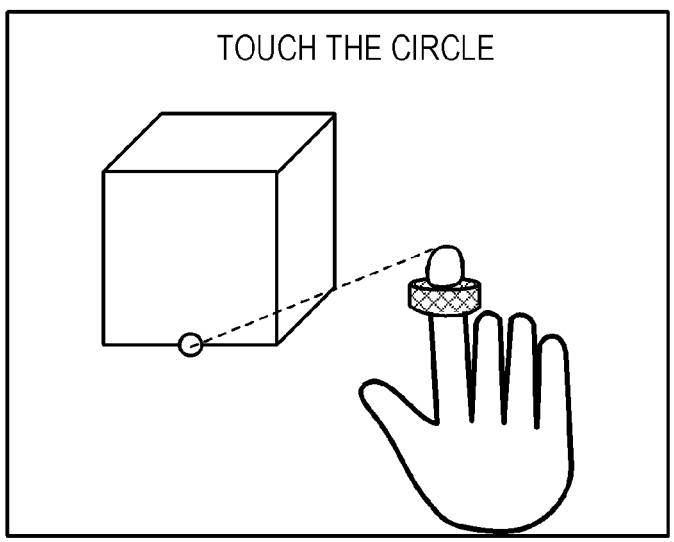

FIGS. 8A to 8H are diagrams for describing the plurality of guides included in the guide information. Each of FIGS. 8A to 8E illustrates a guide that instructs a motion of the user wearing the inertial sensor 101 by displaying a round point (a guide point indicating a position to which the user moves his or her hand) and an arrow (an arrow indicating a direction in which the user moves his or her hand) in a superimposed manner on a CG of a cube. That is, in FIGS. 8A to 8E, the guides each include a cube, a guide point, and an arrow. Specifically, in FIGS. 8A to 8E, the user is instructed to touch the guide point with his or her hand and then change the position and orientation of the hand in accordance with the arrow. Each of FIGS. 8F and 8G illustrates a guide that instructs the user to move to a specific position by using a message (text) representing the instruction content and a cube. Even in the case where the guide point and the arrow are displayed, a message representing the instruction content may be displayed as illustrated in FIG. 8H. In Embodiment 1, since the inertial sensor 101 moves as the user moves, it can be said that the instruction given to the user to move serves as the instruction to move the inertial sensor 101.

In step S135, the display control unit 115 sequentially displays the plurality of guides included in the guide information on the display device 104. Accordingly, the user performs the motions of the inertial sensor 101 in accordance with the displayed guides.

In step S136, the parameter acquisition unit 116 calculates calibration parameters for the inertial sensor 101 based on the inertial information and the information about the position and orientation of the inertial sensor 101 obtained when the user moves the inertial sensor 101 in accordance with the guides. In Embodiment 1, the calibration parameters for the inertial sensor 101 include gains, cross-axis sensitivities, and biases for each of the acceleration and the angular velocity. For example, assuming that accurate values of the angular velocity and the acceleration are obtained from the information about the position and orientation of the inertial sensor 101 acquired by the position and orientation acquisition unit 112, the parameter acquisition unit 116 calculates correspondence relationships between the angular velocity and the acceleration indicated in the inertial information and the corresponding accurate values. Next, the parameter acquisition unit 116 calculates calibration parameters based on the calculated correspondence relationships. An example of a detailed process of step S136 will be described below.

Guide Display Processing

Figure 6:
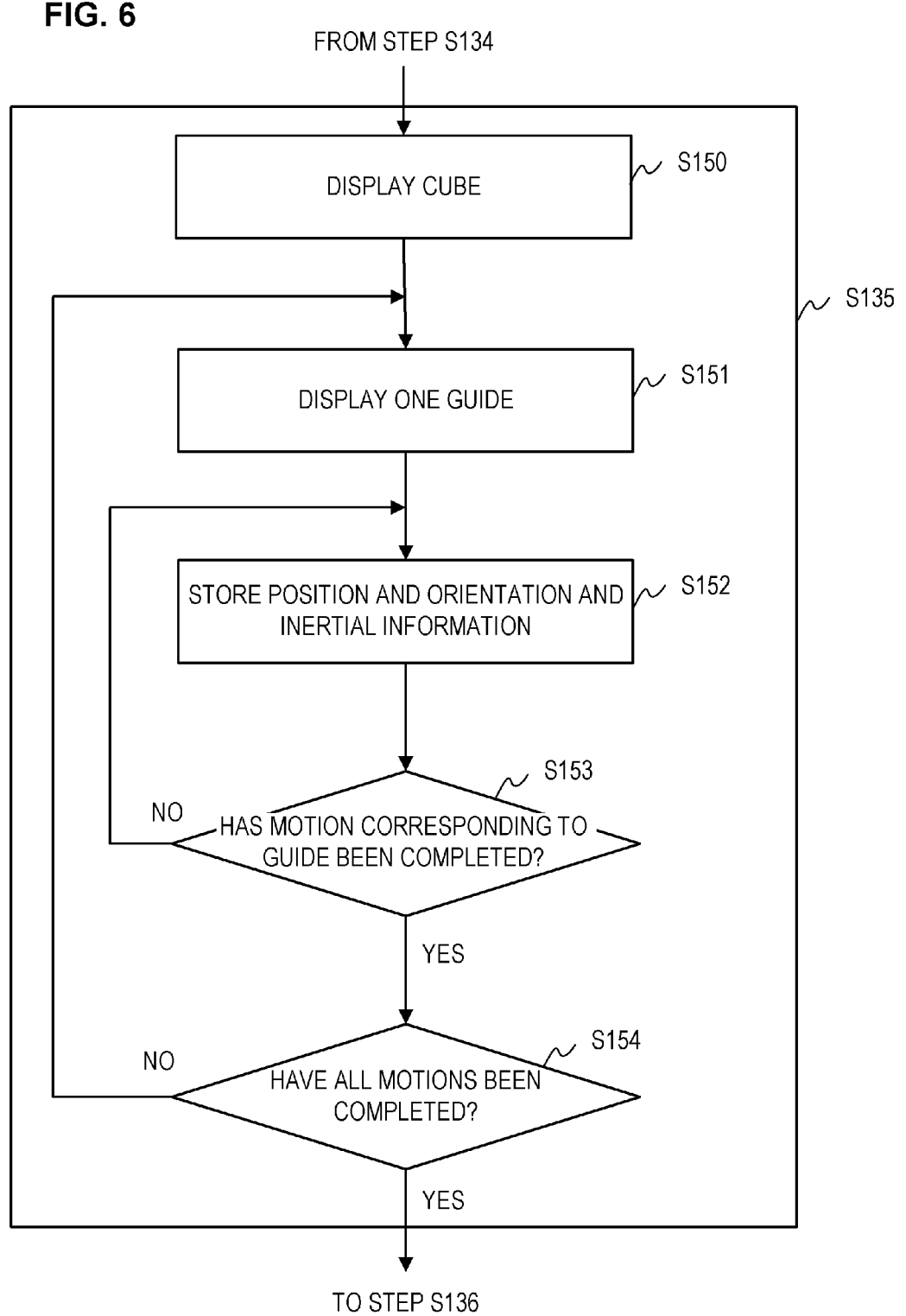
FIG. 6 is a flowchart of guide display processing according to Embodiment 1.

The process of step S135 (guide display processing) will be described in detail with reference to a flowchart illustrated in FIG. 6.

Figure 7:
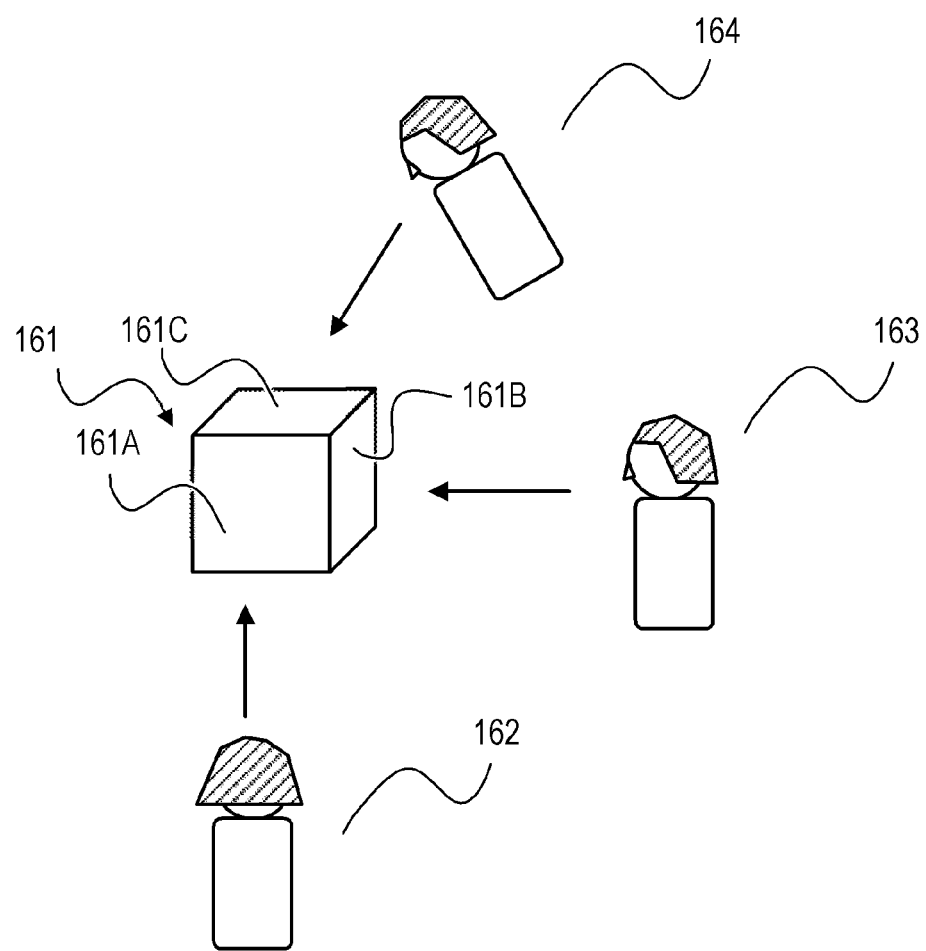
FIG. 7 is a diagram for describing the guide display processing according to Embodiment 1.

In step S150, the display control unit 115 displays a composite image in which a cube 161 (see FIG. 7), which is a CG used for calibration, is placed in a real space (a space represented by the captured image) on the display device 104. Here, the display control unit 115 places the cube 161 at a position in a three-dimensional space represented by the composite image based on the current position and orientation of the inertial sensor 101. In addition, the display control unit 115 displays a guide that instructs the user to move to a front position 162 of the cube 161, as illustrated in FIG. 7, on the display device 104.

In step S151, the display control unit 115 selects a guide to be displayed next from a plurality of guides included in the guide information. Here, information indicating the order in which the plurality of guides are to be displayed may be included in the guide information, or the display control unit 115 may determine the order at random. Next, the display control unit 115 displays the selected guide on the display device 104. The following example will be described, assumed that the guide information includes seven guides.

Figure 9A:
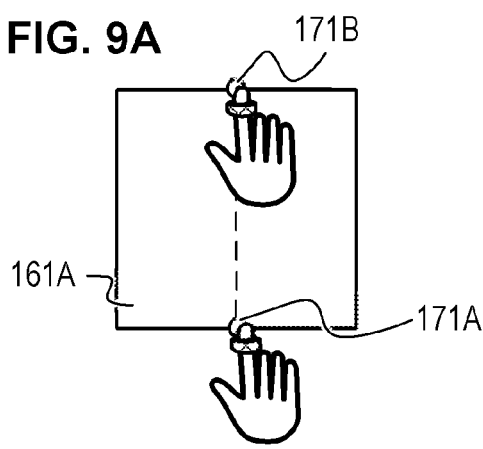
FIGS. 9A to 9E are diagrams for describing motions in accordance with the guides according to Embodiment 1.

When the processing proceeds to steps S151 for the first time, the display control unit 115 selects a guide 171 that instructs to perform a translational motion of the inertial sensor 101 in the Z-axis direction as illustrated in FIG. 8A. The guide 171 displays two guide points 171A and 171B on a front face 161A of the cube 161. The guide 171 instructs the user to trace an arrow indicated by a dashed line with the hand from the lower guide point 171A to the upper guide point 171B. In accordance with the guide 171, first, the user wearing the inertial sensor 101 touches the guide point 171A with the hand, then moves the hand upward, and stops the motion at the guide point 171B, as illustrated in FIG. 9A. In this way, the translational motion of the inertial sensor 101 in the Z-axis direction is performed.

Figure 9B:
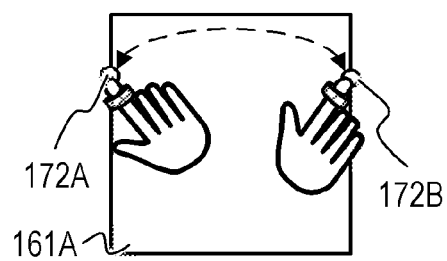

When the processing proceeds to step S151 for the second time, the display control unit 115 selects a guide 172 that instructs to perform a rotational motion of the inertial sensor 101 in the roll direction as illustrated in FIG. 8B. The guide 172 instructs the user to perform at least one reciprocating motion of moving the hand clockwise and counterclockwise while maintaining the hand facing the front face 161A of the cube 161. In accordance with the guide 172, the user rotates the hand between a guide point 172A and a guide point 172B in such a manner as handwaving, as illustrated in FIG. 9B. In this way, the rotational motion of the inertial sensor 101 in the roll direction is performed.

When the processing proceeds to step S151 for the third time, the display control unit 115 displays a guide 176 that instructs to perform a rotational motion of the inertial sensor 101 in the yaw direction as illustrated in FIG. 8F. The guide 176 instructs the user to move from the front position 162 to a position 163 (a position in front of a right side face 161B) as illustrated in FIG. 7 (that is, the guide 176 instructs the user to move so as to view the cube from its right side). When performing this motion, the user moves to the position while maintaining the hand facing the cube 161 (while looking at the cube 161). In this way, the rotational motion of the inertial sensor 101 in the yaw direction is performed.

As described above, the guide instructing the user to perform a rotational motion is displayed (generated) such that the user circles around the cube 161 placed at a fixed position that is more than a specific distance (for example, 1 meter or more) away from the user. In this way, calibration parameters can be calculated without depending on the motion with which the accuracy in calculating the position and orientation of the inertial sensor 101 using a camera (that is, the motion in which the user rotates around the position of the user) is difficult to be secured. Therefore, calibration parameters with high accuracy can be calculated even by a user who is not familiar with suitable motions for the calibration.

Figure 9C:
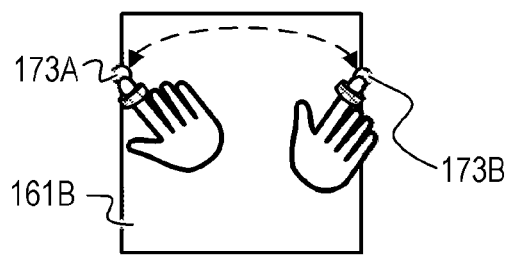

When the processing proceeds to step S151 for the fourth time, the display control unit 115 selects a guide 173 that instructs to perform a rotational motion of the inertial sensor 101 in the roll direction as illustrated in FIG. 8C. Similarly to the guide 172, the guide 173 instructs the user to perform at least one reciprocating motion of moving the hand clockwise and counterclockwise while maintaining the hand facing the right side face 161B of the cube 161. In accordance with the guide 173, the user rotates the hand between a guide point 173A and a guide point 173B in such a manner as handwaving, as illustrated in FIG. 9C. In this way, the rotational motion of the inertial sensor 101 in the roll direction is performed.

Figure 9D:
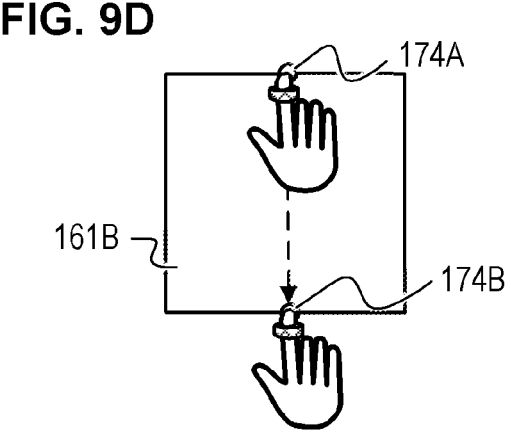

When the processing proceeds to step S151 for the fifth time, the display control unit 115 selects a guide 174 that instructs to perform a rotational motion of the inertial sensor 101 in the Z-axis direction as illustrated in FIG. 8D. The guide 174 instructs the user to move the hand downward following guide points 174A and 174B and an arrow displayed on the right side face 161B. In accordance with the guide 174, the user places the hand of the guide point 174A and then moves the hand toward the guide point 174B (downward) as illustrated in FIG. 9D. In this way, the translational motion of the inertial sensor 101 in the Z-axis direction is performed.

When the processing proceeds to step S151 for the sixth time, the display control unit 115 selects a guide 177 that instructs to perform a rotational motion of the inertial sensor 101 in the pitch direction as illustrated in FIG. 8G. The guide 177 instructs the user to move from a position 164 to a position 163 (a position closer to the cube 161 than the position 164) and look down at the cube 161 (a top face 161C) as illustrated in FIG. 7. When performing this motion, the user moves with the hand pointing at the center of the cube 161. In this way, the rotational motion of the inertial sensor 101 in the pitch direction is performed.

Figure 9E:
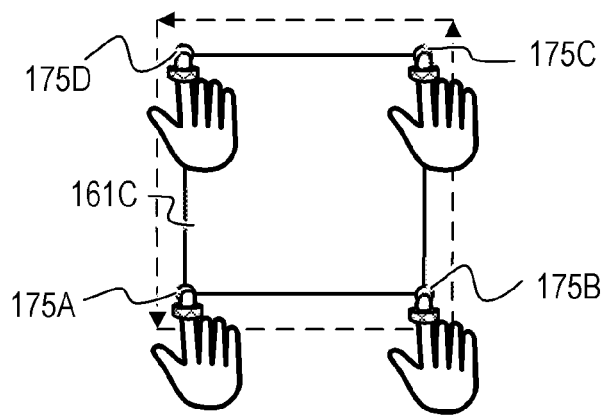

When the processing proceeds to step S151 for the seventh time, the display control unit 115 selects a guide 175 that instructs to perform a translational motion of the inertial sensor 101 in the X-axis direction and a translational motion of the inertial sensor 101 in the Y-axis direction as illustrated in FIG. 8E. The guide 175 instructs the user to sequentially touch the four corners of the top face 161C of the cube 161 with the hand (finger). The user touches guide points 175A, 175B, 175C, and 175D in this order with the hand as illustrated in FIG. 9E. That is, the user moves the hand in the right direction, the depth direction, the left direction, and the front direction in this order. In this way, the translational motion of the inertial sensor 101 in the X-axis direction and the translational motion of the inertial sensor 101 in the Y-axis direction are performed.

In step S152, the storage control unit 113 stores the inertial information acquired by the inertial information acquisition unit 111 and information about the position and orientation acquired by the position and orientation acquisition unit 112 during the processing of step S151 in the storage device 103 (see FIGS. 5A and 5B).

In step S153, the display control unit 115 determines whether the motion of the inertial sensor 101 corresponding to the guide displayed in step S151 has been completed. If it is determined that the motion of the inertial sensor 101 corresponding to the guide has been completed, the processing proceeds to step S154. If it is determined that the motion of the inertial sensor 101 corresponding to the guide has not been completed, the processing proceeds to step S152.

In step S154, the display control unit 115 determines whether the motions corresponding to all the guides (in the present example, seven guides) included in the guide information have been completed. If it is determined that the motions corresponding to all the guides have been completed, the processing proceeds to step S136. If it is determined that any one of the motions corresponding to all the guides has not been completed, the processing returns to step S151.

When the motions corresponding to all the guides have been completed, as illustrated in FIG. 10, for each guide, inertial information and information about a trajectory of the position and orientation of the inertial sensor 101 at a time at which the inertial sensor 101 has performed the motion corresponding to the guide have been obtained. Based on the individual trajectory of the position and orientation of the inertial sensor 101, the acceleration and the angular velocity of each axis of the inertial sensor 101 from the start time to the end time of the corresponding motion can be obtained. When the inertial sensor 101 has performed the motions corresponding to the seven guides as in the present example, as illustrated in FIG. 10 the translational motion corresponding to each of the three axes and the rotational motion corresponding to each of the three axes have been performed. Therefore, the calibration parameters for the inertial sensor 101 can be suitably calculated.

Detailed Processing of Step S136

An example of the processing for calculating calibration parameters (gains, biases, and cross-axis sensitivities) performed by the parameter acquisition unit 116 in step S136 will be described. Note that the following example is merely an example of the processing (a calculation method) for calculating calibration parameters, and the calibration parameters may be calculated by another known method based on the inertial information and the information about the trajectory of the position and orientation stored in the storage device 103.

First, as expressed by Expression 3, the parameter acquisition unit 116 calculates a bias of the angular velocity for each axis direction by calculating an average of differences between the angular velocities each of which is obtained from the change in the position and orientation acquired by the position and orientation acquisition unit 112 and the angular velocities each of which is acquired by the inertial information acquisition unit 111. In Expression 3, $b_w$ represents a bias of the angular velocity of each axis. In Expression 3, $\omega_{gyro}$ represents a value of the angular velocity of each axis measured by the inertial sensor 101. In Expression 3, $\omega_{cam}$ represents a value of the angular velocity obtained from a difference between the position and orientation of the inertial sensor 101 at the start time of the motion and the position and orientation of the inertial sensor 101 at the end time of the motion (or at each time point during the motion) calculated by the position and orientation acquisition unit 112.

$$b_\omega = \omega_{gyro} - \omega_{cam} \qquad \text{Expression 3}$$

The parameter acquisition unit 116 uses the Levenberg-Marquardt method, which is a type of nonlinear optimization method, to calculate the calibration parameters other than the bias of the acceleration. Since the Levenberg-Marquardt method is a known method (disclosed in "Calibration and performance evaluation of low-cost IMUs", etc.), detailed description thereof will be omitted. However, in order to calculate the calibration parameters for the inertial sensor 101, an unknown parameter matrix needs to be defined, and a cost function that minimizes the error of each calibration parameter needs to be generated. For example, as indicated in Expression 4, the parameter acquisition unit 116 defines an unknown parameter matrix $\theta^{acc}$ that includes the calibration parameters as elements for the acceleration sensor. In Expression 4, $g_{axx}$, $g_{ayy}$, and $g_{azz}$ are gains of accelerations, $g_{axy}$, $g_{axz}$, $g_{ayx}$, $g_{ayz}$, $g_{azx}$, and $g_{azy}$ are cross-axis sensitivities, and $b_{ax}$, $b_{ay}$, and $b_{az}$ are biases, as described above.

$$\theta^{acc} = \{g_{axx}, g_{axy}, g_{axz}, g_{ayx}, g_{ayy}, g_{ayz}, g_{azx}, g_{azy}, g_{azz}, b_{ax}, b_{ay}, b_{az}\} \qquad \text{Expression 4}$$

Next, the parameter acquisition unit 116 generates a cost function $L(\theta^{acc})$ for minimizing a difference (error) between a value obtained by calibrating the acceleration indicated by the inertial information by using the calibration parameters and the actual acceleration. The cost function $L(\theta^{acc})$ is determined based on the acceleration (inertial information) measured by the inertial sensor 101 and the acceleration obtained from the information about the trajectory of the position and orientation for each motion pattern. Next, the parameter acquisition unit 116 optimizes the cost function $L(\theta^{acc})$ such that the cost function $L(\theta^{acc})$ is minimized by using the Levenberg-Marquardt method. Since the method for generating and optimizing the cost function $L(\theta^{acc})$ is known (described in "Calibration and performance evaluation of low-cost IMUs", for example), description thereof will be omitted in the present specification. The parameter acquisition unit 116 acquires calibration parameters (that is, $g_{axx}$, $g_{ayy}$, $g_{azz}$, $g_{axy}$, $g_{axz}$, $g_{ayx}$, $g_{ayz}$, $g_{azx}$, $g_{azy}$, $b_{ax}$, $b_{ay}$, and $b_{az}$) corresponding to the optimized cost function $L(\theta^a cc)$.

The parameter acquisition unit 116 can acquire calibration parameters for the angular velocity in a similar manner. First, as indicated in Expression 5, the parameter acquisition unit 116 defines an unknown parameter $\theta^{gyro}$ that includes the calibration parameters other than the bias of the angular velocity as elements. In Expression 5, $g_{\omega xx}$, $g_{\omega yy}$, and $g_{\omega zz}$ are gains, and $g_{\omega xy}$, $g_{\omega xz}$, $g_{\omega yx}$, $g_{\omega yz}$, $g_{\omega zx}$, and $g_{\omega zy}$ are cross-axis sensitivities, as described above.

$$\theta^{gyro} = \{g_{\omega xx}, g_{\omega xy}, g_{\omega xz}, g_{\omega yx}, g_{\omega yy}, g_{\omega yz}, g_{\omega zx}, g_{\omega zy}, g_{\omega zz}\} \qquad \text{Expression 5}$$

The parameter acquisition unit 116 generates a cost function $L(\theta^{gyro})$ for minimizing a difference (error) between a value obtained by calibrating the angular velocity indicated by the inertial information by using the calibration parameters and the actual angular velocity. The cost function $L(\theta^{gyro})$ is determined based on the angular velocity (inertial information) measured by the inertial sensor 101 and the angular velocity obtained from the information about the trajectory of the position and orientation for each motion pattern. Next, the parameter acquisition unit 116 optimizes the cost function $L(\theta^{gyro})$ such that the cost function $L(\theta^{gyro})$ is minimized by using the Levenberg-Marquardt method. Since the method for generating and optimizing the cost function $L(\theta^{gyro})$ is known (described in "Calibration and performance evaluation of low-cost IMUs", for example), description thereof will be omitted in the present specification. The parameter acquisition unit 116 acquires calibration parameters (that is, $g_{\omega xx}$, $g_{\omega yy}$, $g_{\omega zz}$, $g_{\omega xy}$, $g_{\omega xz}$, $g_{\omega yx}$, $g_{\omega yz}$, $g_{\omega zx}$, and $g_{\omega zy}$) corresponding to the optimized cost function $L(\theta^{gyro})$.

The storage control unit 113 stored the calibration parameters acquired by the parameter acquisition unit 116 in the storage device 103. Thus, the parameter acquisition unit 116 can use the calibration parameters when calibrating (correcting) the inertial information of the inertial sensor 101. The inertial information is calibrated by performing the processing described using Expression 1 and Expression 2.

In Embodiment 1, the guide information includes guides each of which instructs to perform the corresponding one of the translational motions in the three-axis directions and the rotational motions around the three axes. Alternatively, the guide information may include only guides each of which instructs to perform the corresponding one of the translational motions in the three-axis directions or may include only guides each of which instructs to perform the corresponding one of rotational motions around the three axes. In addition, the guide information may include only guides each of which instructs to perform the corresponding one of the translational motions in two-axis directions out of the three-axis directions (the translational motions in the two axis directions perpendicular to each other). The guide information may include only guides each of which instructs to perform the corresponding one of the rotational motions around two axes out of the three axes (the rotational motions around the two axes perpendicular to each other). That is, any guide information can be used as long as the cross-axis sensitivity of the acceleration or the angular velocity can be calculated by using the guide information.

According to Embodiment 1, the calibration parameters including the cross-axis sensitivity can be calculated only by causing the user to move the inertial sensor 101 in accordance with the guides displayed on the display device 104. Thus, the calibration parameters including the cross-axis sensitivity can be easily calculated for the inertial sensor in the user environment.

In Embodiment 1, the term "position and orientation" indicates both the position and the orientation. However, when only the calibration parameters of the acceleration are calculated, the "position and orientation" may indicate only the position, and when the calibration parameters of the angular velocity are calculated, the "position and orientation" may indicate only the orientation. That is, the "position and orientation" may indicate the position or the orientation.

Variation 1

The guide information generation unit 114 may generate a guide that instructs to perform a motion of the inertial sensor 101 in which a loop (circle) is drawn in order to acquire the trajectory of the position and orientation of the inertial sensor 101. In this case, the position and orientation acquisition unit 112 calculates the position and orientation of the inertial sensor 101 by SLAM using a camera (that is, by performing feature point tracking). When the position and orientation acquisition unit 112 detects a motion of drawing a loop (a looping motion) based on the captured image, the position and orientation acquisition unit 112 adjusts the information about the trajectory of the position and orientation of the inertial sensor 101 acquired by the position and orientation acquisition unit 112. Specifically, when detecting a motion of drawing a loop, the position and orientation acquisition unit 112 adjusts (corrects) the trajectory of the position and orientation corresponding to the motion drawing the loop such that the trajectory of the position and orientation also draws a loop. The expression "the trajectory of the position and orientation of the inertial sensor 101 draws a loop" means that the position and orientation of the inertial sensor 101 that is in a first position and orientation at the start of the motion or during the motion returns to the first position and orientation again during the motion. For example, when a degree of similarity between two captured images whose respective image-capturing times are different by specific time or more is equal to or more than a threshold, the position and orientation acquisition unit 112 can detect that the motion of drawing a loop is performed between the respective image-capturing times of the two captured images.

Next, the parameter acquisition unit 116 calculates (corrects) the calibration parameters when the trajectory of the position and orientation has been adjusted (based on the adjusted trajectory of the position and orientation). According to Variation 1, by performing the motion of drawing a loop, the accuracy of the position and orientation can be secured so that the gain, the cross-axis sensitivity, and the bias can be accurately calculated (corrected).

Variation 2

The guide information generation unit 114 may generate guide information such that a guide (a first guide) indicating a motion including a translational motion (and a stationary state) of the inertial sensor in the gravity direction (the vertical direction; the Z-axis direction) is displayed before another guide (a second guide). Another guide includes, for example, a guide indicating a translational motion in a direction perpendicular to the gravity direction. That is, the guide information generation unit 114 may instruct the display control unit 115 to display the first guide before the other guides. Accordingly, the display control unit 115 may display on the display device 104 the first guide before the other guides. Note that the acceleration in the gravity direction (gravitational acceleration) at a location varies depending on the latitude of the location. Therefore, according to Variation 2, since the approximate gain of the acceleration in the gravity direction, which needs the calibration most, can be estimated (calculated) first, the accuracy of calculations to be performed later for the other calibration parameters is less likely to decrease.

Variation 3

When the position and orientation acquisition unit 112 calculates the position and orientation of the inertial sensor 101 using a camera, the guide information generation unit 114 may generate guide information without including a guide (for example, the guide 175 in FIG. 8E) indicating a translational motion in the depth direction (front-back direction) as viewed from the user. In this case, the guide information includes a guide indicating translational motions in the vertical and horizontal directions as viewed from the user. According to Variation 3, the calibration parameters can be calculated without depending on information based on the motion with which the accuracy in calculating the position and orientation is difficult to be secured (that is, the translational motion in the depth direction as views from the user) when the camera is used to calculate the position and orientation of the inertial sensor 101. As a result, highly accurate calibration parameters can be calculated.

Variation 4

The information processing system 100 may include a monitoring unit that monitors (determines) whether the current environment in which the inertial sensor 101 is provided is a suitable environment (an environment suitable for measurement by the inertial sensor 101 and calculation of the position and orientation by the position and orientation acquisition unit 112). The case where the current environment is not a suitable environment is, for example, a case where the inertial sensor 101 receives a strong impact or a case where the ambient temperature of the inertial sensor 101 rapidly changes (a case where the temperature change rate is equal to or more than a predetermined value). The case where the current environment is not a suitable environment may be a case where motion blur has occurred in the captured image due to a high moving speed or a high rotation speed of the camera, a case where a moving object widely crosses the captured image, a case where a floor or a wall on which the user is located is uncharacteristic, or the like.

When the monitoring unit determines that the environment in which the plurality of patterns of motions is performed is not a suitable environment, the monitoring unit may instruct the display control unit 115 to display the guide again.

Alternatively, the guide information generation unit 114 may generate new guide information corresponding to the environment in which the plurality of patterns of motions is performed. For example, when motion blur has occurred on the captured image due to a high moving speed or a high rotation speed of the camera, the guide information generation unit 114 generates guide information including a guide that instructs to move the inertial sensor 101 slowly. In the case of an unsuitable environment, the parameter acquisition unit 116 may correct the calibration parameters based on the inertial information and the information about the position and orientation acquired when the motion is performed in accordance with the guide displayed again or may calculate the calibration parameters again. According to Variation 4, even if there is a case where the environment at a specific time is assumed to be a type of environment that reduces the accuracy of the calculated calibration parameters, highly accurate calibration parameters can be calculated.

According to the present invention, calibration parameters including the cross-axis sensitivity can be calculated for the inertial sensor in the user environment.

In the above description, "if A is equal to or more than B, the processing proceeds to step S1, and if A is smaller (lower) than B, the processing proceeds to step S2" may be read as "if A is larger (higher) than B, the processing proceeds to step S1, and if A is equal to or less than B, the processing proceeds to S2". Conversely, "if A is larger (higher) than B, the processing proceeds to step S1, and if A is equal to or less than B, the processing proceeds to step S2" may be read as "if A is equal to or more than B, the processing proceeds to step S1, and if A is smaller (lower) than B, the processing proceed to step S2". Thus, unless a contradiction arises, the expression "equal to or more than A" may be replaced with "A or larger (higher; longer; more) than A" and may be read as or replaced with "larger (higher; longer; more) than A". The expression "equal to or less than A" may be replaced with "A or smaller (lower; shorter; less) than A" and may be read as or replaced with "smaller (lower; shorter; less) than A". In addition, the expression "larger (higher; longer; more) than A" may be read as "equal to or more than A", and the expression "smaller (lower; shorter; less) than A" may be read as "equal to or less than A".

The present invention has thus been described based on the preferred exemplary embodiments. However, the present invention is not limited to these specific exemplary embodiments, and various embodiments without departing from the gist or scope of the present invention are included in the present invention. Some of the above-described exemplary embodiments may be appropriately combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-082996, filed on May 20, 2022, which is hereby incorporated by reference herein in its entirety.

What is claimed is:

1. An information processing device comprising at least one memory and at least one processor which function as: a first acquisition unit configured to acquire inertial information indicating inertial values, which are accelerations or angular velocities of an inertial sensor, from the inertial sensor; a second acquisition unit configured to acquire position and orientation information indicating at least one of a position and an orientation of the inertial sensor; a control unit for configured to control a display for displaying a guide that instructs a user to perform each of a plurality of patterns of motions including two translational motions or two rotational motions, the two translational motions including a translational motion of the inertial sensor corresponding to a first axis and a translational motion of the inertial sensor corresponding to a second axis perpendicular to the first axis, and the two rotational motions including a rotational motion of the inertial sensor corresponding to the first axis and a rotational motion of the inertial sensor corresponding to the second axis; and a parameter acquisition unit configured to acquire parameters including a degree of correlation between actual inertial values of the inertial sensor corresponding to the first axis and the inertial information corresponding to the second axis, based on the inertial information and the position and orientation information acquired when the plurality of patterns of motions of the inertial sensor are performed; and wherein the inertial sensor is mounted on a hand of the user, the display displays a composite image in which a virtual object is placed in an image obtained by capturing a real space, and the control unit controls the display to display the guide with which a guide point indicating a position to which the hand is to be moved is superimposed on the virtual object in the composite image.

2. The information processing device according to claim 1, wherein
the parameter acquisition unit acquires the parameters further including at least any of biases and gains of the inertial values of the inertial sensor, based on the inertial information and the position and orientation information acquired when the plurality of patterns of motions of the inertial sensor are performed.

3. The information processing device according to claim 1, wherein the second acquisition unit acquires the position and orientation information of the inertial sensor, based on an image obtained by capturing the inertial sensor.

4. The information processing device according to claim 1, wherein
the plurality of patterns of motions includes a motion of drawing a loop, and
in a case where the second acquisition unit detects the motion of drawing a loop, the second acquisition unit adjusts the position and orientation information of the inertial sensor such that a trajectory of the position and orientation of the inertial sensor corresponding to the motion of drawing a loop draws a loop.

5. The information processing device according to claim 1, wherein
the plurality of patterns of motions includes a first translational motion that translates the inertial sensor in a vertical direction and a second translational motion that translates the inertial sensor in a direction perpendicular to the vertical direction, and
the control unit controls the display to display a guide that instructs the user to perform the first translational motion and subsequently controls the display to display a guide that instructs the user to perform the second translational motion.

6. The information processing device according to claim 1, wherein
the plurality of patterns of motions do not include a motion that translates the inertial sensor to a front-back direction of the user.

7. The information processing device according to claim 1, wherein
the inertial sensor is worn by the user, and
the plurality of patterns of motions includes a rotational motion that rotates the inertial sensor by the user's rotation around a fixed position that is more than a specific distance away from the user.

8. The information processing device according to claim 1, wherein
the at least one memory and the at least one processor further function as a monitoring unit configured to determine whether an environment, in which the inertial sensor is provided when the plurality of patterns of motions of the inertial sensor are performed, is a specific environment,
in a case where the environment is the specific environment, the control unit controls the display to display the guide again, and
the parameter acquisition unit acquires the parameters, based on the inertial information and the position and orientation information acquired when the plurality of patterns of motions instructed by the guide displayed again are performed.

9. An information processing method, comprising: a first acquiring step of acquiring inertial information indicating inertial values, which are accelerations or angular velocities of an inertial sensor, from the inertial sensor; a second acquiring step of acquiring position and orientation information indicating at least one of a position and an orientation of the inertial sensor; a controlling step of controlling a display for displaying a guide that instructs a user to perform each of a plurality of patterns of motions including two translational motions or two rotational motions, the two translational motions including a translational motion of the inertial sensor corresponding to a first axis and a translational motion of the inertial sensor corresponding to a second axis perpendicular to the first axis, and the two rotational motions including a rotational motion of the inertial sensor corresponding to the first axis and a rotational motion of the inertial sensor corresponding to the second axis; and a parameter acquiring step of acquiring parameters including a degree of correlation between actual inertial values of the inertial sensor corresponding to the first axis and the inertial information corresponding to the second axis, based on the inertial information and the position and orientation information acquired when the plurality of patterns of motions of the inertial sensor are performed; and wherein the inertial sensor is mounted on a hand of the user, the display displays a composite image in which a virtual object is placed in an image obtained by capturing a real space, and the control unit controls the display to display the guide with which a guide point indicating a position to which the hand is to be moved is superimposed on the virtual object in the composite image.

10. A non-transitory computer readable medium that stores a program, wherein the program causes a computer to execute an information processing method, wherein the information processing method includes: a first acquiring step of acquiring inertial information indicating inertial values, which are accelerations or angular velocities of an inertial sensor, from the inertial sensor; a second acquiring step of acquiring position and orientation information indicating at least one of a position and an orientation of the inertial sensor; a controlling step of controlling a display for displaying a guide that instructs a user to perform each of a plurality of patterns of motions including two translational motions or two rotational motions, the two translational motions including a translational motion of the inertial sensor corresponding to a first axis and a translational motion of the inertial sensor corresponding to a second axis perpendicular to the first axis, and the two rotational motions including a rotational motion of the inertial sensor corresponding to the first axis and a rotational motion of the inertial sensor corresponding to the second axis; and a parameter acquiring step of acquiring parameters including a degree of correlation between actual inertial values of the inertial sensor corresponding to the first axis and the inertial information corresponding to the second axis, based on the inertial information and the position and orientation information acquired when the plurality of patterns of motions of the inertial sensor are performed; and wherein the inertial sensor is mounted on a hand of the user, the display displays a composite image in which a virtual object is placed in an image obtained by capturing a real space, and the control unit controls the display to display the guide with which a guide point indicating a position to which the hand is to be moved is superimposed on the virtual object in the composite image.

* * * * *